Dec. 4, 1962    V. R. JOHNSON    3,066,754
SINGLE FREQUENCY PROSPECTING
Filed Sept. 29, 1959    2 Sheets-Sheet 1

Virgil R. Johnson    Inventor
By James E. Reed    Attorney

Dec. 4, 1962 V. R. JOHNSON 3,066,754
SINGLE FREQUENCY PROSPECTING
Filed Sept. 29, 1959 2 Sheets-Sheet 2

Virgil R. Johnson   Inventor
By James E. Reed   Attorney

United States Patent Office 3,066,754
Patented Dec. 4, 1962

3,066,754
SINGLE FREQUENCY PROSPECTING
Virgil R. Johnson, Tulsa, Okla., assignor to Jersey Production Research Company, a corporation of Delaware
Filed Sept. 29, 1959, Ser. No. 843,225
3 Claims. (Cl. 181—.5)

The present invention relates to seismic methods for investigating subterranean formations and more particularly relates to an improved seismic prospecting system useful in locating subsurface zones not readily detected in conventional seismic prospecting operations. In still greater particularity, the invention relates to a method of seismic prospecting wherein effects of subsurface strata upon a series of essentially single frequency seismic wave trains are measured in order to permit detection of stratigraphic traps and similar subsurface zones.

Seismic methods are widely employed in prospecting for oil and natural gas. Such methods conventionally involve the measurement of time intervals required for an elastic wave to reach discontinuities beneath the earth's surface in the area being prospected and to be reflected or refracted back to the surface. Detonation of an explosive charge or dropping of a weight onto a plate affixed to the earth is generally used to generate the elastic wave. Wave energy reflected or refracted back to the surface is detected by transducers or geophones spaced in a prearranged pattern. The geophones generate electrical signals whose amplitudes vary in proportion to the amplitudes of the detected waves. These signals are then recorded to produce a record of variations in signal amplitude with time. By examining such a record and noting the time intervals required for waves reflected from certain discontinuities to reach various points on the surface, information which permits computation of the depth of the discontinuities can usually be obtained. Seismic profiles showing the strata underlying the area of interest can then be prepared. Anticlines, faults, salt domes, and other structural traps in which oil and gas are sometimes found can often be located by means of such profiles.

Although seismic methods yield much useful information concerning structural traps such as those mentioned above, stratigraphic traps are often overlooked during the analysis of conventional seismic records. Stratigraphic traps in general owe their existence to variations in the permeability, porosity or thickness of particular strata and are not characterized by prominent structural changes readily detected on a seismic profile. In order to overcome this disadvantage of conventional seismic methods, it has been suggested that seismic records be analyzed in terms of their frequency contents. It is known that certain frequency components of an elastic wave may be cancelled or reinforced as it passes through a subsurface interval. Components of the wave reflected from the discontinuities bounding the interval may add to or in part cancel one another and thus produce a change in the frequency spectrum of the detected signal. Such changes are likely to be accentuated in sand lenses, reefs, channels, and other types of stratigraphic traps because of pronounced differences between the material within the trap and adjacent strata. The extent to which the frequency spectra of seismic signals are changed may therefore constitute a valuable guide to the locations of stratigraphic traps.

The methods generally employed heretofore for obtaining information concerning the effects of subterranean formations upon the frequency characteristics of seismic waves involves the analysis of recorded seismic signals in terms of their frequency spectra. By recording the geophone signals upon magnetic tape and then playing back the record through a series of electrical filters, changes in the frequency spectrum at any point in the record can theoretically be detected. In actual practice, however, the results obtained in this manner are not wholly satisfactory. Although such methods permit high resolution in terms of record time intervals and hence permit depths at which recognized frequency effects occur to be fixed with considerable accuracy, frequency resolution is usually poor because of the short time sample of reflected energy available for frequency analysis. Moreover, the range over which frequency effects can be detected when energy initiated by a dynamite shot or the like is utilized is limited because low frequency components of the energy are preferentially transmitted by the earth. The high frequency components picked up by the geophones are usually very weak and tend to be obscured by amplifier noise due to loading of the amplifier with low frequency signals. Noise in the seismic frequency range cannot be effectively eliminated by the relatively broad band electrical filters used in conventional systems and hence cancellation and reinforcement of individual components of the detected waves also tend to be obscured by frequency effects attributable to energy from extraneous sources. As a result, frequency analysis as a means for detecting stratigraphic traps has not been markedly successful to date.

The present invention provides a new and improved seismic prospecting method which permits the frequency effects of a subterranean formation to be readily assessed and hence facilitates the application of seismic techniques to the problem of detecting stratigraphic traps within subterranean formations. In accordance with the invention, essentially single frequency seismic wave trains are employed in place of the relatively broad band wave trains obtained when an explosive charge is detonated or a weight is dropped upon the earth's surface. The use of a wave train having essentially one frequency permits the effect of the formation on wave energy of the particular frequency utilized to be quickly recognized. By carrying out a series of tests in which each wave train utilized has a different frequency within the seismic frequency range, extremely high frequency resolution is obtained and hence the overall frequency effects of the subsurface interval of interest can be determined much more accurately than when broad band seismic waves are utilized. Profiles and contour maps showing the frequency effects thus detected will demonstrate lateral changes in the subsurface intervals of interest which may indicate prospective oil pools contained in stratigraphic traps.

In addition to improved frequency resolution and resultant ease of detecting frequency effects as pointed out above, the method of the invention has several other advantages over conventional seismic methods employed heretofore. Because very narow band filters can be used in recording the essentially single frequency wave utilized in accordance with the invention, random noise due to wind effects, electronic components of the recording system and the like can be minimized. Similarly, interference due to power lines and other electrical installations in the area being prospected can be virtually eliminated by selecting the test frequencies so that they are sufficiently removed from power frequencies to permit very high filter discrimination. The method of the invention is relatively insensitive to variations in the near surface of the area being prospected, the primary requirement being that there be no resonances in the generator or detector couplings, and hence less interference due to such variations is encountered than with conventional methods. The invention permits the making of measurements at higher frequencies than can be used with broad band seismic methods because the broad band methods are severely restricted by combined effects of strong earth absorption of high frequency components and the limited dynamic range of conventional recording systems. Moreover, the processing of data obtained in accordance with the invention for frequency information is relatively simple and can be readily carried out with a minimum of equipment.

A variety of elastic wave generators capable of generating a controlled frequency vibratory impulse in the range between about ten and about one hundred and fifty cycles per second may be utilized in practicing the invention. A combination of an engine-driven alternating current generator electrically coupled to a large electromagnetic assembly which vibrates synchronically with the alternating current from the generator is one example of a transducer suitable for purposes of the invention. The frequency of the alternating current and the frequency with which the electromagnetic assembly vibrates can readily be controlled by controlling the speed of the engine which drives the alternating current generator. The amplitude of the elastic wave produced by such a transducer can be regulated by controlling the alternating current fed to the transducer coils. An engine directly connected to a shaft having an eccentric weight mounted thereon may also be used as an energy source. Counter-rotating shafts connected by suitable gears so that they rotate at the same speed but in opposite directions, each shaft bearing an eccentrically mounted weight, may be employed to obtain better control of the direction in which the elastic wave is propagated. Regulation of the speed at which the engine drives the shafts permits control of the frequency of the elastic wave generated. Various electrical and electronic vibrators whose frequencies can be controlled to produce essentially single frequency elastic waves may also be used. A number of such vibrators are available commercially and will be familiar to those skilled in the art.

The essentially single frequency seismic wave train generated during prospecting operations carried out in accordance with the invention may have frequencies in the range between about 10 cycles per second and about 150 or more cycles per second. It is normally preferred to carry out a series of tests during each prospecting operation and to use a different frequency during each test in order that a comprehensive picture of the effects of the subterranean interval of interest under investigation may be obtained. A program for such an operation might, for example, include tests made at 25, 45, 65, 85 and 105 cycles per second. Power frequencies, 60 cycles per second for example, should ordinarily be avoided.

The duration of the wave trains employed in practicing the invention may range from about 0.1 second to a half second or longer, depending upon the time interval over which the energy returned to the surface from subsurface discontinuities is to be investigated. Since the method of invention is not primarily concerned with detecting the precise time required for energy to travel to a reflecting discontinuity and be returned to the surface, and instead is directed to the detection of frequency effects which the waves undergo in traveling through the formation, high resolution in terms of time is not required. It is sufficient that operation of the wave generator be halted prior to the arrival of reflected energy from the interval of interest. Wave trains of from about 0.1 to about 0.25 second duration are generally most satisfactory for purposes of the invention and are preferred.

Conventional seismic detectors or geophones are utilized for picking up the wave energy returned to the surface from subsurface discontinuities. These detectors may be spaced upon the surface at selected distances from the wave generator in any suitable pattern or array. One geophone will normally be positioned adjacent to the wave generator in order to provide a check on the wave frequency, the pulse duration, and the amplitude at each of the frequency levels utilized during the prospecting operation.

The electrical signals generated by the geophones in response to energy reflected to the surface during practice of the invention are amplified and then fed to a suitable recording device. Conventional amplification apparatus may be employed. The filters utilized will be very narrow band filters adapted to exclude signals whose frequencies differ from that of the initial elastic wave train. Noise from extraneous sources is therefore largely eliminated. The signal generated by each geophone is recorded as a separate trace upon a seismic record after it has been amplified and filtered. Various recording methods may be utilized. Normally it is preferred to first record the signals in reproducible form on tape, wire, or a similar magnetic recording medium and later transcribe them onto a chart or photographic film for subsequent study and analysis. The final record may be of the oscillographic, variable area, or variable density type. Color recording methods may also be employed.

The exact nature and objects of the invention can be more fully understood by referring to the following detailed description of a seismic prospecting operation carried out in accordance therewith and to the accompanying drawings, in which:

FIG. 1 schematically represents apparatus useful in the practice of the invention;

Figure 1:
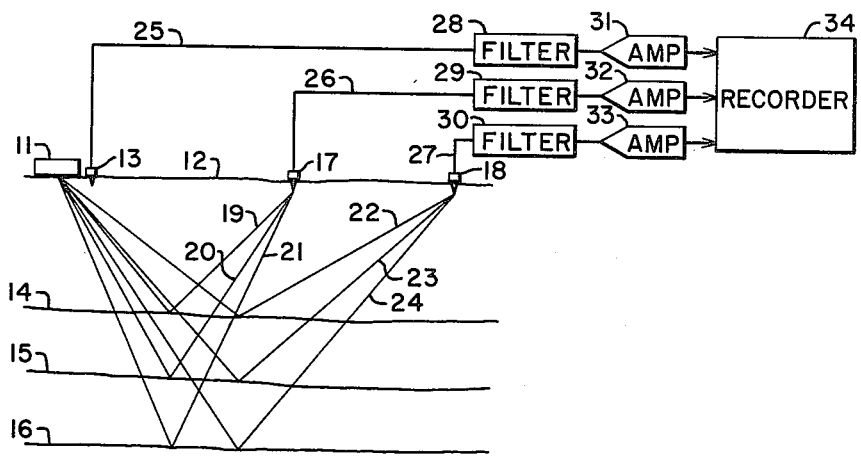

Turning now to FIG. 1, reference numeral 11 designates an elastic wave generator capable of generating an essentially single frequency seismic wave train. Generator 11 may be an electrical vibrator, an unbalanced flywheel or a similar device capable of generating a vibratory impulse in the seismic frequency range between about 10 and 150 cycles per second. The generator is positioned on the earth's surface, designated by reference numeral 12, and may be coupled thereto by clamping it to stakes driven into the earth or by other methods. Means are provided for varying the frequency of the generated signal. The means utilized will, of course, depend upon the type of generator employed. The generator provided is utilized to produce an elastic wave of preselected frequency, an 80 cycles per second sine wave for example. This wave is generated for a period less than the time required for wave energy to be reflected back to the surface from the subsurface interval of interest. Generation of the sine wave for a period of about 0.25 second will normally be sufficient. A seismic detector or geophone 13 is positioned on or contiguous to generator 11 in order to produce an electrical counterpart of the transmitted signal. This signal is recorded to provide a record of the frequency, pulse duration, and amplitude of the transmitted signal. As will be pointed out hereafter, a variety of recording methods may be utilized for recording information provided by geophone 13.

The essentially single frequency elastic wave produced by generator 11 travels outwardly from the generator in all directions. A portion of the energy transmitted downwardly into the earth by the generator will be reflected back toward the surface upon reaching the first discontinuity beneath the surface, represented by line 14. Additional energy will later be reflected in the direction of the surface as the elastic wave subsequently encounters lower discontinuities such as those depicted by lines 15 and 16 in FIG. 1. The presence of many such discontinuities may result in the arrival of reflected energy at the surface over a period of from 4 to about 6 seconds after the initial impulse from generator 11 has been terminated. The time interval over which reflected energy can be detected at the surface will depend in part, of course, upon the distance of the detection point from generator 11. Energy will arrive at points near the generator before it reaches more distant points. The reflected energy will vary in amplitude depending upon the depth of the discontinuity from which it was reflected and upon the extent to which cancellation and reinforcement occur within the strata through which it passes.

The energy reflected as described above is detected upon reaching the earth's surface by seismic detectors or geophones 17 and 18 positioned at points removed from the source of the original seismic wave. Energy reaching the geophone by traveling along the surface and energy from other sources, power lines, for example, may be similarly detected. Although only two geophones are shown in FIG. 1, in most cases it will be preferred to employ a plurality of geophones arranged in a predetermined pattern or array spread over a considerable area. The use of 36 or more geophones in a single array is not uncommon. By using multiple geophones, much of the interference and noise otherwise obtained can be eliminated. Many suitable arrays will be familiar to those skilled in the art. Each geophone produces a sinusoidal electrical signal which varies in amplitude in proportion to the amplitude of the reflected energy and noise reaching it. The portion of each signal representing reflected energy occurs in a time sequence corresponding to the sequence in which the original wave was reflected from subsurface discontinuities. The output from geophone 17, for example, will first indicate energy reflected from discontinuity 14 along path 19, will later correspond to energy reflected from discontinuity 15 along path 20, and still later will indicate energy reflected from discontinuity 16 along path 21. In like manner, energy reflected from discontinuities 14, 15, and 16 along paths 22, 23 and 24 will be indicated in order in the output signal from geophone 18. By noting the time at which any phenomenon in the signal occurs, it is thus possible to determine the approximate level of the substrata responsible for the phenomenon. It will be recognized that the subsurface structure represented in FIG. 1 is greatly simplified and that actual subsurface structures are generally much more complex.

The electrical signals produced by geophones 17 and 18, as well as signals from geophone 13, are conducted through leads 25, 26 and 27 to electrical filters 28, 29 and 30. Each filter is a sharply peaked, narrow band filter whose center frequency is essentially the same as the frequency of the elastic wave emitted by generator 11. It is generally preferred that the band pass characteristics of the filters closely approximate the band width of the generated signal. Since the frequency of the reflected energy detected by the geophones will normally be the same as or very close to the frequency of the original elastic wave from source 11, all the reflected energy will pass the filters. Energy due to wind effects, power line interference, and similar phenomena will generally have frequencies different from that of the reflected energy and hence will be eliminated by the filters. Surface energy and energy traveling to the geophones by paths other than reflective paths will largely be eliminated by the geophone pattern or array employed. This is particularly true where relatively high frequencies are employed because the near surface tends to absorb such frequencies to a much greater extent than do the deeper layers and hence vertically traveling energy tends to increase relative to near surface energy. The output from the filters will therefore consist primarily of transients attributable to reflections from the subsurface strata and will be relatively free of noise and interference.

The signals thus obtained are amplified in conventional seismic amplifiers 31, 32 and 33 and fed to recording system 34. It is preferred that the recording system utilized be one productive of a readily reproducible record. Magnetic wire and tape recorders are widely utilized in preparing reproducible records of seismic signals and hence will be satisfactory. Visual type recording systems producing oscillographic traces, variable area traces, or variable density traces upon a chart or upon a black and white or color-sensitive photographic medium may also be employed. Many suitable recording systems will suggest themselves to those skilled in the art.

Figure 2:
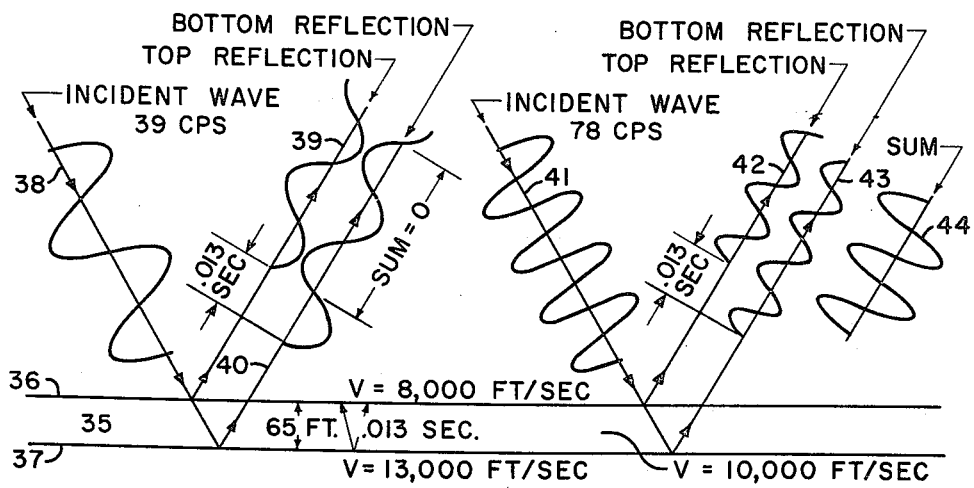
FIG. 2 is a schematic representation of an interval beneath the earth's surface illustrating the manner in which the amplitudes of signals having particular frequencies may be altered in such an interval.

FIG. 2 of the drawing is a schematic representation of a subsurface layer illustrating the manner in which changes in the amplitudes of particular frequencies occur as seismic waves are reflected from the boundaries of such a layer. It can be seen from FIG. 2 that layer 35 is a horizontal bed 65 feet thick which is bounded by upper discontinuity 36 and lower discontinuity 37. Layer 35 has a seismic velocity of 10,000 feet per second; while the formation above discontinuity 36 has a velocity of 8,000 feet per second and that below discontinuity 37 has a velocity of 13,000 feet per second. If, as shown, an incident seismic wave having a frequency of 39 cycles per second travels downwardly through the upper formation along path 38 until it reaches discontinuity 36, a portion of the wave energy will be reflected upwardly along path 39. The unreflected portion of the wave will travel through bed 35 and will in part be reflected upwardly upon reaching discontinuity 37. The path of this later reflected energy is indicated by reference numeral 40. Since the velocity of the wave in bed 35 is 10,000 feet per second, it will require 0.013 second for the wave energy to travel from discontinuity 36 to discontinuity 37 and be reflected back to discontinuity 36. This 13 millisecond time interval corresponds to the time interval during which the wave undergoes one-half cycle. As a result, the reflected energy traveling upwardly along path 40 will be 180° out of phase with that traveling along path 39. These two reflections will therefore cancel one another and the sum of the energy transmitted back toward the surface will be zero.

If a wave having a frequency of 78 cycles per second were used in place of the 39 cycles per second wave, the result would be quite different. The path of an incident wave of 78 cycles per second traveling downward in the formation is indicated by reference numeral 41 in FIG. 2. A portion of the energy in this wave will be reflected upwardly along path 42 from discontinuity 36. Since the velocity of bed 35 is the same as in the former case, 10,000 feet per second, wave energy reflected from lower discontinuity 37 will be 0.013 second behind that reflected from discontinuity 36. This corresponds to one full cycle of the 78 cycles per second wave and hence the energy reflected from the two discontinuities will be in phase. Reinforcement with respect to amplitude will occur. The energy traveling back toward the surface will therefore have considerably greater amplitude than would otherwise be the case. This is indicated by the waveform identified by reference numeral 44 in FIG. 2.

Figure 3:
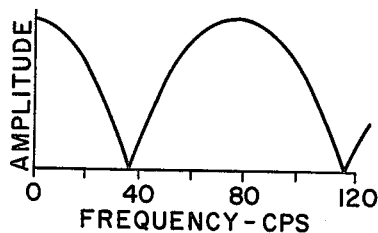
FIG. 3 is a graph showing the relationship between the amplitude and the frequency of energy reflected from the interval represented in FIG. 2; and, FIG. 4 represents a section of a seismic record prepared in accordance with the invention.

The response of the bed represented in FIG. 2 to different frequencies can readily be determined and is shown in FIG. 3 of the drawing. For this particular bed, null points will occur at frequencies of 39 and 117 cycles per second and maximum amplitude will be obtained at 78 cycles per second. By noting the extent to which such changes in amplitude occur when seismic waves having particular frequency characteristics are propagated into the earth, stratigraphic traps and similar subsurface intervals in which oil and gas may be present can often be located. The use of essentially single frequency waves in accordance with the invention permits the detection of such changes much more readily than is possible when conventional seismic prospecting techniques are utilized.

It will be understood that the situation represented in FIGS. 2 and 3 of the drawing is a greatly simplified one and that in most cases much more complex reflection patterns than those shown will be obtained. Most subterranean formations consist of many discrete layers and hence there may be many changes in the amplitude of the reflected energy. The relatively long wave trains employed in practicing the invention do not permit high resolution in terms of record time intervals and hence it is generally necessary to consider changes in amplitude which occur over subsurface intervals, rather than those which occur over single layers. Pronounced changes in amplitude over such intervals often indicate the existence of stratigraphic traps and may furnish other valuable information to the trained geophysicist.

Figure 4:
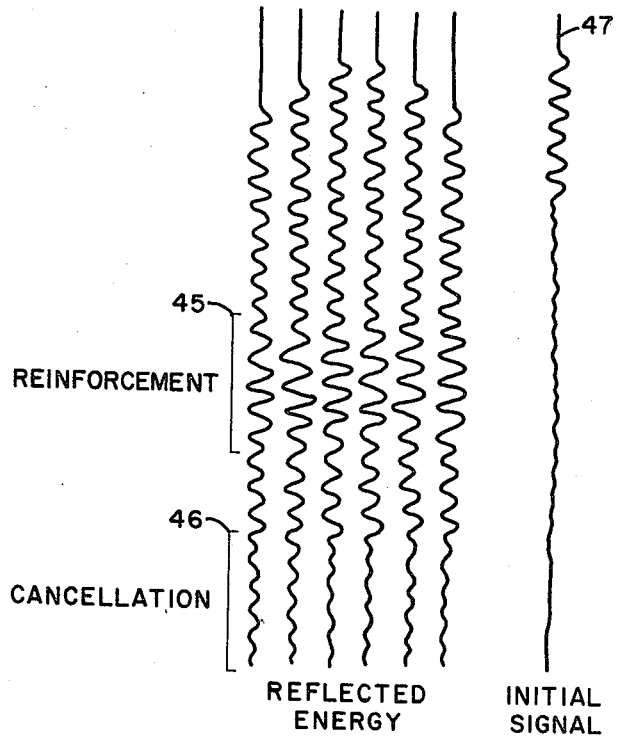

FIG. 4 of the drawing represents a section of a seismic record containing six oscillographic traces prepared in accordance with the invention. A trace representing the original elastic wave produced by the elastic wave generator indicated by reference numeral 11 in FIG. 1 is also shown for purposes of comparison and identified by reference numeral 47. It will be seen from FIG. 4 that each of the six traces has a relatively constant frequency but varies in amplitude. Since noise and interference from extraneous sources were largely eliminated by the narrow band filters through which the signals were passed before they were recorded and by the geophone array employed, these variations in amplitude are primarily due to variations in the subsurface strata through which the reflected wave energy passed on its way to the surface. Bracket 45 in FIG. 4 indicates a section of the record wherein the amplitude of the reflected wave energy is greater than that of previous sections due to reinforcement of the elastic waves as it passed through a particular interval. In like manner, bracket 46 indicates a section of the record wherein a portion of the reflected energy was cancelled as it passed through a particular interval. This reinforcement and cancellation of the particular frequency employed indicate that the subsurface intervals in which the reinforcement and cancellation occurred may possess properties unlike those of other intervals within the area prospected. Profiles and contour maps prepared upon the basis of records obtained during such operations may permit the location of lateral discontinuities which may delineate stratigraphic traps and other subsurface peculiarities which cannot be readily detected on conventional seismic profiles.

A series of essentially single frequency wave trains, each having a different frequency, may be generated in sequence for each geophone array utilized during a seismic prospecting operation carried out in accordance with the invention. As pointed out above, subsurface intervals respond differently to different frequencies and hence the use of such a sequence of wave trains provides much more information than can be obtained in a prospecting operation wherein only one frequency is utilized. Successive wave trains must, of course, be separated by time intervals sufficiently long to avoid interference between reflections due to one wave train and those due to another. These time intervals must be at least six seconds but will normally be somewhat longer.

Since a record such as that represented in FIG. 4 of the drawing does not admit of high resolution of record time intervals because of the relatively long initial wave train employed, such a record cannot be used to locate precisely the depth of the detected intervals. The method of the invention thus differs from so-called frequency modulated continuous wave prospecting methods. Methods of the latter type must utilize a nonrepetitive signal so that the moment at which energy reflected from a subsurface discontinuity reaches the surface can be accurately determined. High frequency resolution useful for the detection of frequency effects is not attained with such methods.

Although seismic records prepared in accordance with the invention may be processed in various ways in order to increase their utility, extensive processing is usually unnecessary. By utilizing very narrow band filters and suitable geophone arrays and by selecting frequencies remote from ordinary power frequencies, most of the noise and interference encountered in conventional prospecting systems can largely be eliminated. So long as reasonable care is taken to avoid resonance in the generator and geophone couplings, the information obtained is relatively unaffected by variations in the near surface. In some cases it may be desirable to square and integrate the signals in order to obtain average values over the time intervals of interest, but this is not an essential step. Conventional apparatus may be utilized to obtain such average values either before or after the detected signals are first recorded.

What is claimed is:

1. A method for detecting seismic frequency effects within intervals underlying the earth's surface which comprises initiating successive essentially single frequency elastic wave trains at a fixed point near the earth's surface, the durations of said wave trains exceeding about 0.1 second, said wave trains having different frequencies in the range between about 10 and about 150 cycles per second, and successive wave trains being separated in time by an interval sufficient to avoid interference of one wave train with another; detecting wave energy reflected from subsurface strata to points on the earth's surface in response to said wave trains; and recording changes in the amplitude of said wave energy reflected in response to said wave trains with time.

2. A seismic method for detecting frequency effects within subsurface intervals which comprises propagating downwardly into the earth from a fixed point near the earth's surface a series of discrete, essentially single frequency seismic wave trains, said wave trains having different frequencies in the range between about 10 and about 150 cycles per second, said wave trains having durations of from about 0.1 to about 0.5 second, and successive wave trains being separated in time by an interval in excess of about 6 seconds; detecting wave energy reflected from subsurface strata in response to said wave trains at at least one point on the earth's surface; filtering said detected wave energy to eliminate frequency components distinct from those of said wave trains; and recording changes in the amplitude of individual frequencies with time.

3. A method for detecting seismic frequency effects within intervals underlying the earth's surface which comprises generating at a fixed point on the earth's surface a series of discrete, essentially single frequency seismic impulses at time intervals of at least about six seconds, said impulses having different frequencies in the range between about 10 and about 150 cycles per second and durations of from about 0.1 to about 0.5 second; detecting seismic energy reflected to the earth's surface in response to said impulses at at least one point removed from the point of impulse; filtering the energy detected in response to said impulses to obtain essentially single frequency signals corresponding to said impulses; recording changes in the amplitudes of said essentially single frequency signals with time, and averaging amplitude values over intervals of interest by squaring and integrating the recorded information.

References Cited in the file of this patent

UNITED STATES PATENTS

| | | |
|---|---|---|
| 2,281,751 | Cloud | May 5, 1942 |
| 2,355,826 | Sharpe | Aug. 15, 1944 |
| 2,521,130 | Scherbatskoy | Sept. 5, 1950 |
| 2,745,507 | Bodine | May 15, 1956 |
| 2,795,287 | Sharpe | June 11, 1957 |
| 2,826,750 | Grannemann | Mar. 11, 1958 |
| 2,866,512 | Padberg | Dec. 30, 1958 |